Patented May 31, 1932

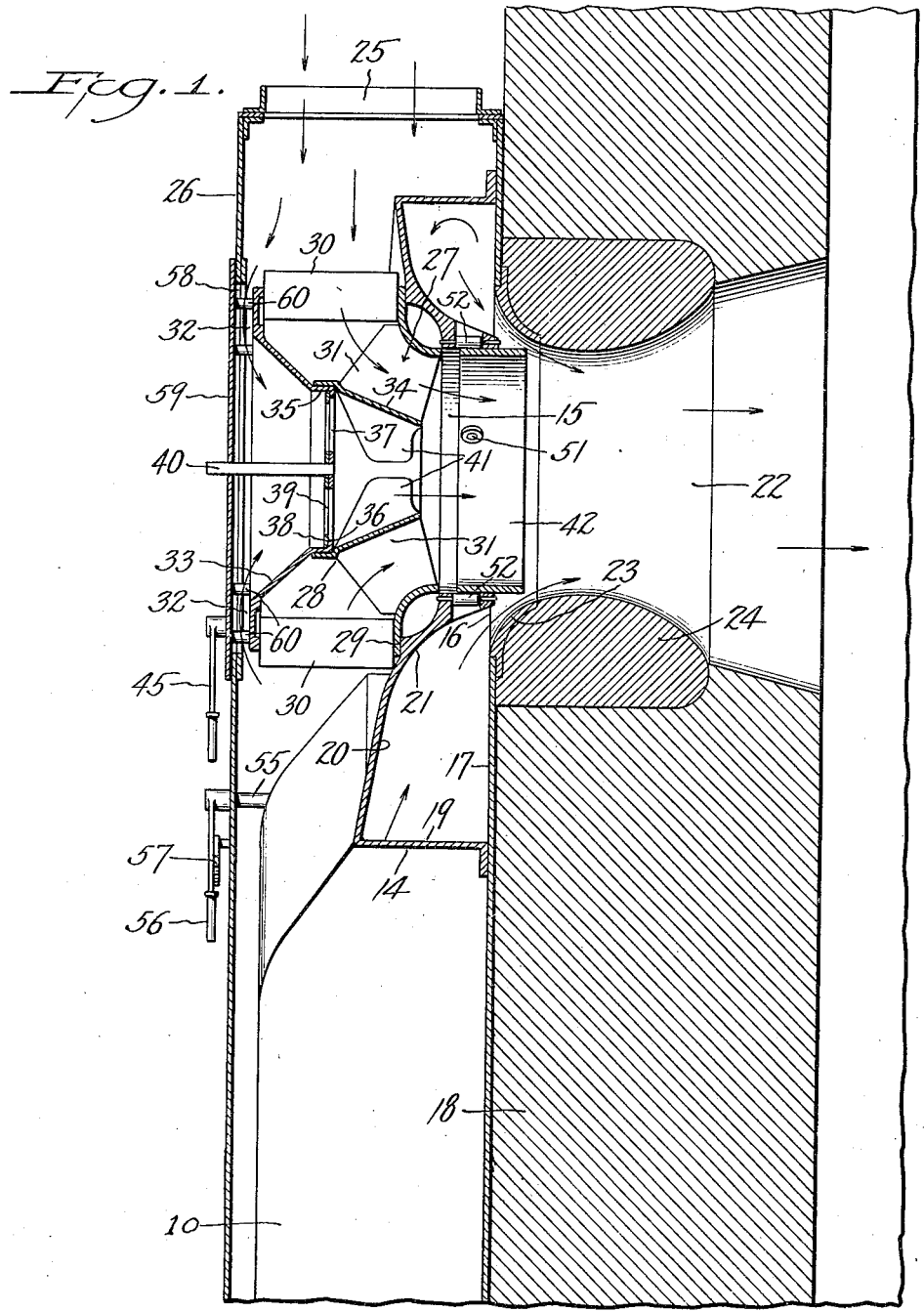

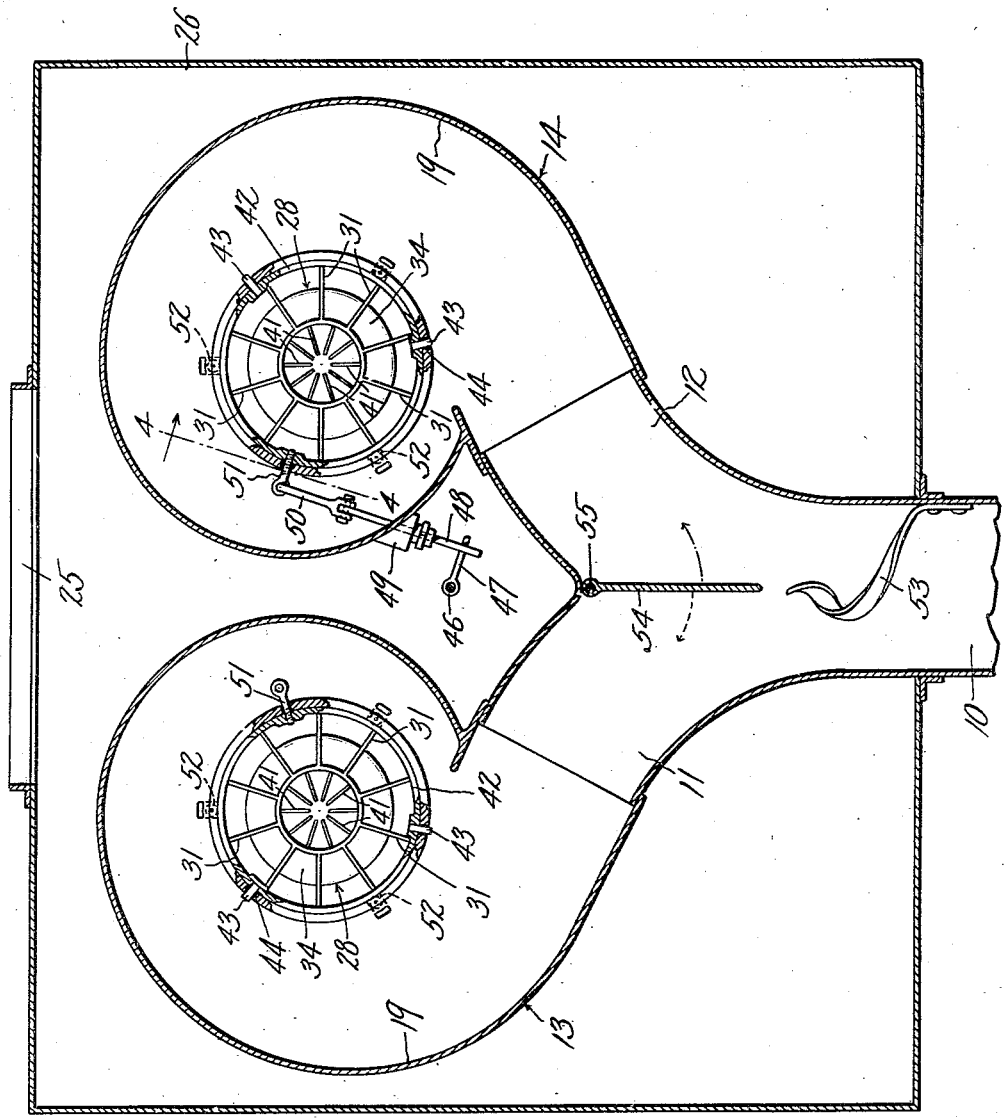

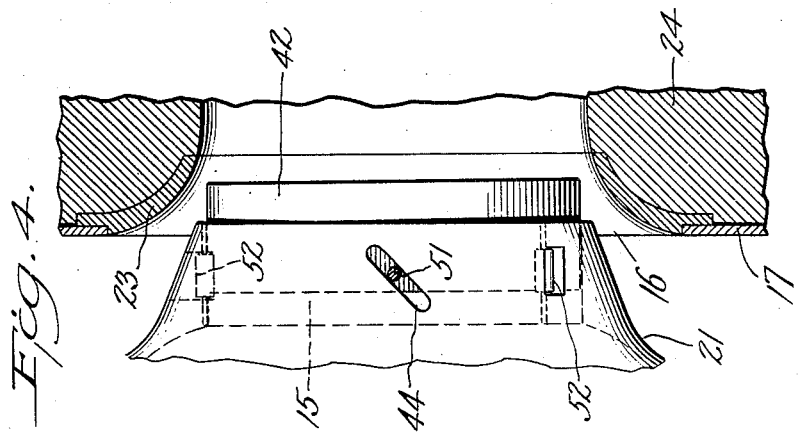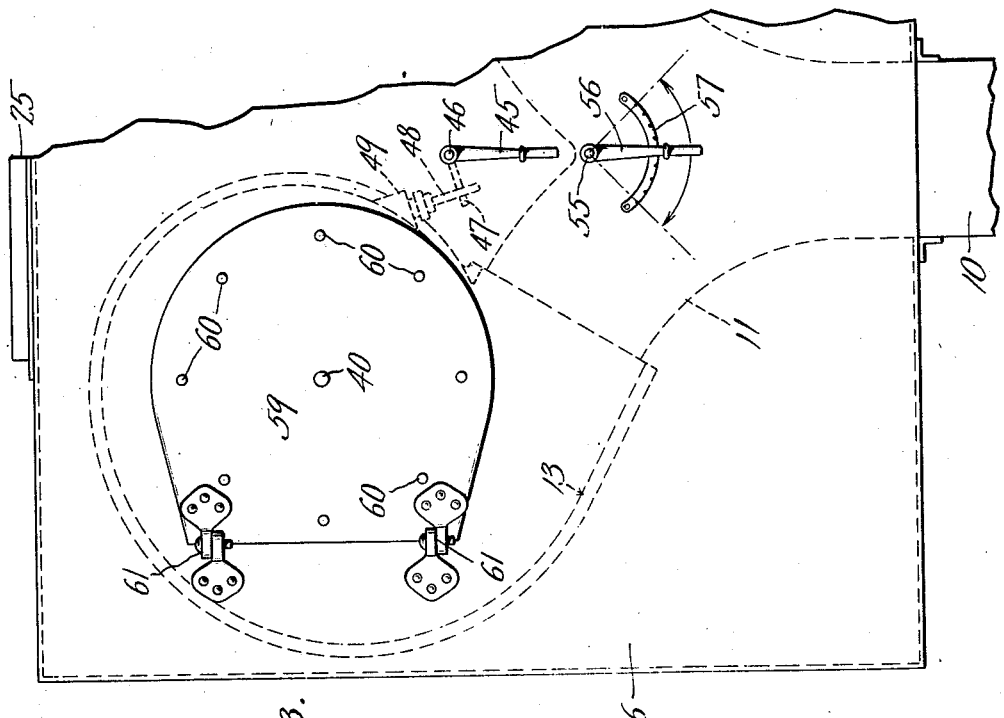

1,860,987

UNITED STATES PATENT OFFICE

DANIEL L. BRAINE, OF BROOKLYN, AND DAVID J. IRISH, OF RICHMOND, NEW YORK, ASSIGNORS, BY DIRECT AND MESNE ASSIGNMENTS, TO FOSTER WHEELER CORPORATION, OF NEW YORK, N. Y., A CORPORATION OF NEW YORK

METHOD AND APPARATUS FOR BURNING POWDERED FUEL

Application filed June 23, 1926. Serial No. 117,954.

Our present invention relates to a method and apparatus for burning powdered fuel, and more particularly to methods and apparatus for maintaining finely divided solid fuel in suspension during its supply and distribution to a furnace and throughout its combustion, and for controlling the distribution of the powdered fuel and its mixture with air in proper proportions for complete and uniform combustion.

In burning powdered fuel, the pulverized fuel is conveyed in suspension in a current of air for combustion and is projected with this air into the furnace. Owing to the tendency of the fuel particles to settle out of the air, difficulties arise in keeping the particles in suspension for a sufficient length of time without imparting to the air such a high velocity as to carry the particles out of the furnace before they have had time for complete combustion. In providing a high velocity and a long path for the fuel and air mixture, it is difficult to prevent or avoid a scouring action of the flame and fuel particles on the furnace lining. The proper distribution of the fuel and air to and through the burners is also a matter of some difficulty, owing to the tendency of the fuel particles to be thrown in one direction or another by changes in direction of flow of the carrying current of air.

These difficulties are obviated in our present invention, an object of which is to provide a method and apparatus by which a large quantity of powdered fuel can be burned very rapidly in a furnace, and by which complete combustion of the coal while in suspension may be obtained.

Another object of our invention is to provide a method and apparatus in which the mixture and ignition of the air and fuel take place at the front central portion of the furnace rather than near the side walls, thereby lessening or avoiding the scouring action on the furnace walls.

A further object of the invention is to provide a method and apparatus in which the air and fuel particles may be given a velocity independent of their rate of passage through the furnace, or of their length of travel, and in which the movement of the fuel and air through the furnace is variable, independently of this carrying velocity.

Further objects and features of the invention are to provide a fuel-feeding device that is structurally independent of the furnace walls, and that may be readily removed therefrom; to provide means for accurately and uniformly distributing a suspension of fuel in air; to provide a furnace in which the velocity of the fuel or mixture may be constant and uniform regardless of the rate of feed, and to provide a method and apparatus for burning powdered fuel in which the air for combustion may be preheated, and in which the powdered fuel may be ignited with an oil flame.

With these and other objects in view, which will appear in the following description of the invention, the invention comprises the method and apparatus described and set forth in the following specification and claims.

The various features of the invention are illustrated in the accompanying drawings, in which:

Fig. 1 is a vertical sectional view of a portion of a furnace wall and a powdered fuel burner embodying a preferred form of the invention.

Fig. 2 is a vertical sectional view of the powdered fuel burner taken on a plane at right angles to that of Fig. 1.

Fig. 3 is an elevation of a portion of the powdered fuel burner shown in Figs. 1 and 2, and

Fig. 4 is a section of a portion of the powdered fuel burner taken on line 4—4 of Fig. 2.

In our present invention a suspension of finely divided solid fuel in air is supplied to the furnace through a conduit which converges in the form of a spiral or involute about a central passage. The mixture of fuel and air is given a rotary or circling movement in passing through the involute and escapes sidewise of the plane of the involute in a circular or helical path through an annular opening formed in the face of the involute adjacent the furnace and encircling the central passage of the furnace wall. To provide the proper distribution and the required movement of the circulating air and fuel current to the rear of the furnace, the cross sectional area of the involute portion of the conduit decreases as the radius of the involute decreases. The whirling current of air and fuel after passing through the annular outlet opening of the involute is given any desired movement towards the rear of the furnace by means of a current of secondary air fed through the central passage centrally of the whirling current of fuel and primary air. This secondary air is preferably given a direction of rotation reverse to that of the primary air and fuel current by means of vanes in the secondary passage in order to cause a greater agitation and more rapid mixing of the air and coal with secondary air as it passes into the furnace. The speed of the whirling current of secondary air towards the rear of said furnace is preferably controlled by supplying a current of air at an adjustable velocity directly rearwardly through the rotating secondary air. By controlling this speed, the distance in the furnace at which combustion is completed is controlled.

In case a greater amount of fuel is to be burned than is supplied by a single burner or involute, the burners are arranged in pairs, fed from a single conduit, which branches outwardly about the involute with the involutes turning towards each other with reversed curvatures, so that the fuel and air currents in the furnace have their greatest velocities of rotation at their line or plane of contact.

Referring more particularly to the accompanying drawings, a current of primary air carrying powdered fuel in suspension is supplied through a conduit 10 which divides at its upper end to form branches 11 and 12 leading respectively to a pair of spiral or involute conduits 13 and 14. The construction of these involutes 13 and 14 and the elements associated therewith are substantially identical, except that the parts in one involute giving the air a rotatory movement are positioned reversely to the similar parts in the other. Therefore the same numerals will be applied to similar parts or elements of both involutes. It will be understood that these sections need not be exact or mathematically accurate involutes, but may approximate the involute shape.

Upon entering the involute sections 13 and 14, respectively, the air and suspended fuel are given a circular or rotary movement about a secondary passage 15, a portion of this air and fuel being permitted to escape through an annular opening 16 in a rear wall 17 of the involute section adjacent the furnace wall 18 and encircling the passage 15. As the outer or enclosing wall 19 of the sections 13 and 14 is formed in the shape of an involute, the cross sectional area of the sections constantly decreases as the air current passes therethrough and thereby tends to force the air uniformly through the annular openings 16. To give the issuing air current a slight axial movement into the furnace as well as its circular movement, the front wall 20 of the involute section opposite the wall 17 is brought slightly nearer the wall 17 as the air progresses through the involute and as the radius of the involute decreases. To further guide the air into and through the opening 16, the wall 20 is sharply curved at 21 rearwardly to the plane of the wall 17. The air leaving through the opening 16 passes through an opening 22 in the furnace wall 18 and enters the furnace. As it leaves the outlet opening 16, the air is guided by means of a bell shaped or converging annular collar 23, which forms a continuation of the surface of the wall 17 and guides the air through a Venturi ring 24, fitted in the opening 22. The air passing from the opening 16 has a very rapid circulating movement, and a relatively slight forward movement through the opening 22.

To provide sufficient air for complete combustion and also to give a controlled direct movement into the furnace to the rotating stream of air and fuel, a supply of secondary air is forced or admitted through an opening 25 into a box or feed chest 26 which encloses the involute portions 13 and 14. From the chest or box 26, the secondary air passes through an annular passage 27, between a central guiding funnel 28 and a curved annular plate or ring 29 resting on the outer edge of the passageway 15. Upon leaving the passage 27, the air passes through the passage 15 into the Venturi opening 22 and commingles with and drives the rotating current of air and fuel issuing from the opening 16 into the furnace.

To increase the agitation of the two currents of air and to promote their thorough intermixture after they have passed into the furnace, the secondary air passing through the central passage 15 is given a circular or rotatory motion in a direction reverse to that of the air issuing from the opening 16. For this purpose, after passing the register plates 30, mounted between the outer edges of the funnel 28 and the curved plate 29, the secondary air is given a twisting or circulatory movement by means of a number of curved vanes 31 mounted at regular intervals in the passage 27 between the funnel 28 and plate 29. The current of air issuing from the passage 27 is also given a direct movement by causing a portion of the air entering the box 26 to pass through a passage 32 between the outer edge of the funnel 28 and the wall of the box 26, and into the interior of the funnel 28, and thence to issue directly into the center of the stream of secondary air, and thence into the current of primary air and fuel.

The forward velocity of the central stream of secondary air, and consequently of the resulting mixture passing through the venturi 24, may be controlled by means of a damper formed in the funnel 28. This damper may be conveniently formed by making the funnel 28 in two portions, a front frusto-conical member 33 and a rearward frusto-conical member 34 having a front rim which telescopes over a cylindrical portion 35 of the front frusto-conical member. A plate 36 extends across the end of the cylindrical portion 35 and is provided with radial openings 37. On this plate 36 is placed a second plate 38 having openings 39, which register with or overlap the openings 37 to a greater or less extent according to the position of the plate 38. The position of plate 38 may be adjusted by means of a hollow shaft 40. The rear element 34 is preferably provided with a number of radial vanes 41 to direct the air in a direct course, or, if desired, in a slightly twisting direction.

It is desirable to propel the air through the opening 16 and over the plate 23 at a uniform velocity regardless of the quantity of air and fuel supplied to the furnace and to control the supply of fuel in accordance with the requirements of the furnace, by varying the opening 16 rather than by varying the velocity of the air. For this purpose, a collar 42 is slidably mounted on a cylindrical inner surface of the passage 15 so that it may be moved towards or from the plate 23, and thereby control the area of the cross section of the opening 16. When the air supplied through the central passage 15 is not under forced draft, this collar 42 may also serve to give the issuing fuel and air jet a forward movement. By moving the collar 42 rearwardly to the position indicated and giving it a "lead" the air and fuel blast may be given a forward movement that will create suction or draft of secondary air to the central opening in the collar and prevent eddying into the central opening through which the air is drawn.

The collar 42 is moved forwardly and rearwardly by means of pins 43 projecting outwardly from the outer surface of said collar into slots 44 cut diagonally in the wall of the passage 15, so that as the collar 42 is turned in one direction or the other, the lateral movement of the pins 43 propels the collar 42 forwardly and rearwardly. The collar 42 is rotated by means of a crank 45 on the outside of the box 26 operating a shaft 46 extending into the box and having a crank 47 within the box 26 from which the movement is transmitted through a link 48 extending through a stuffing box 49 into the involute chamber and connected therein through a link 50 and pin 51 to the collar 15.

The collar 15 is guided in its rotation by means of rollers 52, mounted in spaced position about the surface 42.

It will be noted that the secondary air supplied through the opening 25, box 26 and passage 27, does not come into contact with the suspended powdered fuel until it enters the furnace. This air may therefore be preheated to any desired temperature without involving any complications that might be brought about through changing the condition of the coal while being conveyed to the furnace.

The burner construction described above may be employed as a unit, or, where the consumption of fuel in the furnace makes it advisable, a number of such burners may be employed. In the latter case, the burners may be arranged in pairs, as shown in Fig. 2, and the streams of powdered fuel and air supplied through the conduit 10 branch outwardly at 11 and 12, and each branch stream then passes first upwardly through the portion of the involute at the outer side of its respective central passage 15, and then as the streams of air and fuel pass through the involute portions, they rotate towards each other. Consequently, upon issuing from their respective outlets 16 into the furnace, the rotating currents of fuel and air reach their most rapid and pronounced rotational movement as they move inwardly and downwardly toward each other and thus bring about the most rapid diffusion and combustion, and consequently the most intense heat, at their contact in the middle portion of the furnace. This arrangement thus provides a concentration of the flame in the central part of the furnace, rather than at the furnace walls, thus avoiding the scouring action that might otherwise be caused.

It is quite important to distribute the air and fuel evenly and uniformly to the two branch conduits 11 and 12 and to their respective involute burners. There may be, and frequently is, however, a tendency for the fuel to be thrown to one side or other of the conduit 10 because of the centrifugal or other impulse given to the air in its passage. To insure a uniform distribution, a screw-shaped blade 53 is provided which extends inwardly from a wall of the conduit 10 and twists about the center line of the conduit. Immediately above this blade 53, a swinging damper 54 is mounted on a supporting rock shaft 55, which is swung to various positions of adjustment by a handle 56 outside of the box 26, and having a positioning arc 57 to hold it in its adjusted positions.

The apparatus described above may be of any suitable construction. In the preferred form shown in the drawings, however, it is so arranged that all parts are readily accessible, so that the air control device may be removed from the involute wall 21 as a unit and opened for repair or inspection. The outer wall of the box 26 is therefore provided with an opening 58 through which the funnel 28 may be inserted and removed. The opening 58 is normally closed by a door 59. The frustoconical member 33 is supported by means of posts 60 on the door 59, the posts 60 being so constructed as to provide the space 32. The member 34 is rigidly connected to the cone member 33 and the various vanes are supported on these members and are thus removable with the door. The vanes 27 and register plates 30 and the curved collar or plate 29 are also mounted and secured on the cone 28 and are removed through the opening 58 when the door is swung outwardly. Thus by swinging back the door 59 on hinges 61, all parts of the air control device are swung out of the box 26 and exposed to view except the involute portions 13 and 14 and the collar 15 carried thereby.

Through the above invention, therefore, the coal is kept suspended in a rapidly moving current of air, while at the same time the movement of this current of air through the furnace may be controlled or limited to any desired extent. By arranging the burners in pairs, as described, a concentration of the flame may be obtained in the front central part of the furnace, rather than at the furnace walls and the erosion of the furnace walls may be avoided or a broader more widely diffused flame may be obtained, as desired, by controlling the central propelling blast of air, or by properly proportioning the rotating and driving blasts, any desired shape or intensity of flame may be obtained.

As changes of construction could be made within the scope of our invention, it is intended that all matter contained in the above description or shown in the accompanying drawings shall be interpreted as illustrative and not in a limiting sense.

Having described our invention, what we claim and desire to secure by Letters Patent is:

1. Apparatus of the type described which comprises a central passage for supplying a blast of secondary air, a conduit for primary air and suspended fuel particles having a wall provided with an opening forming an annular outlet encircling said central passage and an enclosing wall curved in the form of an involute to form a passage of decreasing width curving about said central passage, an annular surface converging rearwardly from the edge of said opening, and a ring slidable in said central passage towards and from said converging surface.

2. Apparatus of the type described which comprises a conduit for primary air and suspended particles of fuel having a front wall in which is formed a central passage, a rear wall having an opening forming an annular outlet about said central passage and an enclosing wall between said front and rear walls curving in the form of an involute to form a passage of decreasing width curving about said central passage, a box for secondary air enclosing said involute passage and having an opening opposite said central passage, a door closing said opening, and a frusto-conical member supported on said door with its base slightly spaced from said door and projecting towards said central passage.

3. Apparatus of the type described which comprises a conduit for primary air and suspended particles of fuel having a front wall in which is formed a central passage, a rear wall having an opening forming an annular outlet about said central apssage and an enclosing wall between said front and rear walls curving in the from of an involute to form a passage of decreasing width curving about said central passage to give said primary air and suspended particles of fuel a movement of rotation about said central passage, a box for supplying secondary air enclosing said involute passage and having an opening opposite said central passage, a door closing said opening, a frusto-conical member supported on said door with its base slightly spaced from said door and projecting towards said central passage, and vanes mounted on the outer surface of said frusto-conical member and curved to rotate air passing about said frusto-conical member reversely to that issuing from said annular outlet.

4. Apparatus of the type described which comprises a conduit for primary air and suspended particles of fuel, having a front wall in which is formed a central passage and a rear wall having an annular outlet about said central passage and an enclosing wall between said front and rear walls curving in the form of an involute to form a passage of decreasing width curving about said central passage to give said air and suspended fuel a movement of rotation about said central passage, a box for supplying secondary air enclosing said involute passage, and having an opening opposite said central passage, a door closing said opening, a frusto-conical member supported on said door with its base slightly spaced from said door and projecting towards said central passage, vanes mounted on the outer surface of said frusto-conical member and curved to rotate air passing about said frusto-conical member reversely to that issuing from said annular outlet, and a damper in said frusto-conical member to control the passage therethrough.

5. Apparatus of the type described. which comprises, a secondary air box, a central passage from said air box, a primary air and fuel conduit mounted within and at one wall of said box and converging and curving in the form of an involute about the central passage and having an annular outlet through said wall about said central passage, the opposite wall of said box having an opening opposite said central passage, a door closing said opening, a funnel mounted on said door co-axially with said central passage, curved vanes mounted on said funnel and projecting towards said annular passage and means for controlling the admission of air through the interior of said funnel.

6. Apparatus of the type described which comprises a secondary air box, a primary air and fuel conduit within and mounted on the rear wall of said box and curving and converging in the form of an involute about a central passage through said wall, said conduit having an annular outlet through said wall about said central passage, an annular surface converging rearwardly from the outer edge of said outlet, the front wall of said box having an opening, a door closing said opening, a funnel mounted on said door and projecting towards said central passage, curved vanes on said funnel extending towards said central passage, and means for controlling the passage of air from said box through said funnel.

7. Apparatus of the type described which comprises a conduit for primary air and fuel, said conduit having a pair of branches diverging and then circling inwardly towards each other in the form of involutes and forming a pair of central secondary air passages, said involute portions each having an annular outlet about and adjacent said central passages, a proportioning damper at the juncture of said conduit and branches, and a blade extending from one wall of said conduit in advance of said branches and spiralling about the axis of said conduit.

8. An annular chamber encircling a central passage and having an annular opening in its rear wall about said central passage, a furnace wall having an opening converging rearwardly from the outer edge of said annular opening, an annular wall projecting from said central passage towards said converging furnace opening and means for adjusting said annular wall towards or from said converging furnace opening, said annular chamber having a wall of approximately involute curvature to progressively diminish the cross sectional area of said annular chamber.

9. A fluid fuel burner comprising an annular chamber encircling a central passage and having an annular opening in its rear wall about said central passage, a furnace wall having an opening converging rearwardly from the outer edge of said annular opening, an annular wall projecting from said central passage towards said converging furnace opening, and means for adjusting said annular wall towards or from said converging furnace opening.

10. A fluid fuel burner comprising an annular chamber encircling a central passage and having an annular opening in its rear wall about said central passage, a furnace wall having an opening converging rearwardly from the outer edge of said annular opening, an annular wall projecting from said central passage towards said converging furnace opening, and means for adjusting said annular wall towards or from said converging furnace opening, said annular chamber having an inlet and having a front wall converging towards said rear wall at increasing circumferential distances from said inlet.

11. A fluid fuel burner which comprises an annular wall forming a central passage, a chamber encircling said annular wall and having front and rear walls extending outwardly from said annular wall and an enclosing outer wall between said front and rear walls to form an annular passage, said passageway having an inlet at one part of its circumference and an annular outlet encircling said central passage at the rear edge of said annular passage, the front wall of said chamber converging toward said rear wall at progressive angular distances from one side of said inlet about said central passage towards the opposite side of said inlet.

12. A fluid fuel burner which comprises an annular wall forming a central passage, a chamber encircling said annular wall and having front and rear walls extending outwardly from said annular wall and an enclosing outer wall between said front and rear walls to form an annular passage, said passageway having an inlet at one part of its circumference and an annular outlet encircling said central passage at the rear edge of said annular passage, the front wall of said chamber converging toward said rear wall at progressive angular distances from one side of said inlet about said annular wall towards the opposite side of said inlet, and an air chamber enclosing said fuel chamber and communicating directly with said central passage.

13. A fluid fuel burner which comprises an annular wall forming a central passage, a chamber encircling said annular wall and having front and rear walls extending outwardly from said annular wall and an enclosing outer wall between said front and rear walls to form an annular passage, said passageway having an inlet at one part of its circumference and an annular outlet encircling said central passage at the rear edge of said annular passage, the front wall of said chamber converging toward said rear wall at progressive angular distances from one side of said inlet about said annular wall towards the opposite side of said inlet, and a furnace wall adjacent said rear wall and having an opening converging inwardly from the outer edge of said annular opening.

14. A fluid fuel burner which comprises an annular wall forming a central passage, a chamber encircling said annular wall and having front and rear walls extending outwardly from said annular wall and an enclosing outer wall between said front and rear walls to form an annular passage, said passageway having an inlet at one part of its circumference and an annular outlet encircling said central passage at the rear edge of said annular passage, the front wall of said chamber converging toward said rear wall at progressive angular distances from one side of said inlet about said annular wall towards the opposite side of said inlet, and means for controlling the passage of air through said central passage.

15. A fluid fuel burner which comprises an annular wall forming a central passage, a chamber encircling said annular wall and having front and rear walls extending outwardly from said annular wall and an enclosing outer wall between said front and rear walls to form an annular passage, said passageway having an inlet at one part of its circumference and an annular outlet encircling said central passage at the rear edge of said annular passage, the front wall of said chamber converging toward said rear wall at progressive angular distances from one side of said inlet about said annular wall towards the opposite side of said inlet, and means for giving the air passing through said central passage a rotational movement in a direction reverse to that of the fluid passing through said chamber.

16. A fluid fuel burner which comprises an annular wall forming a central passage, a chamber encircling said annular wall and having front and rear walls extending outwardly from said annular wall and an enclosing outer wall between said front and rear walls to form an annular passage, said passageway having an inlet at one part of its circumference and an annular outlet encircling said central passage at the rear edge of said annular passage, the front wall of said chamber converging toward said rear wall at progressive angular distances from one side of said inlet about said annular wall towards the opposite side of said inlet, an air chamber enclosing said fuel chamber and communicating directly with said central air passage, and means for controlling the passage of air from said air chamber into said central passage and for giving the air a rotational movement opposite that of fluid passing through said chamber.

17. A fluid fuel burner which comprises an air passage, a fluid fuel chamber encircling said air passage and having an inlet at a limited part of its periphery, said fuel chamber having an annular opening about said air passage, the dimension of said fuel chamber parallel to the axis of said air passage diminishing from one side of said inlet at progressive angular distances about the circumference of axis of said fuel chamber to the opposite side of said inlet to cause the fuel entering said inlet to flow in the direction of said diminishing dimension.

In testimony whereof we hereunto affix our signatures.

DANIEL L. BRAINE.
DAVID J. IRISH.